(12) United States Patent
Chang

(10) Patent No.: US 7,107,699 B2
(45) Date of Patent: Sep. 19, 2006

(54) WORKPIECE SIZE ALIGNMENT DEVICE

(76) Inventor: Pin-Feng Chang, 16-1, Lane 884, San Feng Rd., Fen Yuan, Taichung Hsien (TW)

( * ) Notice: Subject to any disclaimer, the term of this patent is extended or adjusted under 35 U.S.C. 154(b) by 0 days.

(21) Appl. No.: 11/054,981

(22) Filed: Feb. 10, 2005

(65) Prior Publication Data

US 2006/0174505 A1  Aug. 10, 2006

(51) Int. Cl.
*B23Q 3/00* (2006.01)
*B27B 27/00* (2006.01)

(52) U.S. Cl. .............................. 33/760; 33/464; 269/303
(58) Field of Classification Search ................ 33/645, 33/700, 712, 759, 760, 809, 810, 533, 436, 33/443, 464; 269/45, 73, 303, 307; 83/468
See application file for complete search history.

(56) References Cited

U.S. PATENT DOCUMENTS 3,280,660 A * 10/1966 Westra .................. 408/91
3,374,545 A * 3/1968 Monroe .................. 33/293
4,693,158 A * 9/1987 Price ...................... 83/468
5,063,983 A * 11/1991 Barry ..................... 144/371
5,337,641 A * 8/1994 Duginske ................ 83/468
5,443,554 A * 8/1995 Robert .................. 83/468.7
5,768,966 A * 6/1998 Duginske ............. 83/468.7
6,145,210 A * 11/2000 Walczynski ............. 33/458
6,557,601 B1 * 5/2003 Taylor .................. 144/253.1
6,802,499 B1 * 10/2004 Grosso ................... 269/71
6,880,442 B1 * 4/2005 Duginske ............. 83/468.7

* cited by examiner

*Primary Examiner*—R. Alexander Smith
(74) *Attorney, Agent, or Firm*—Alan D. Kamrath; Nikolai & Mersereau, P.A.

(57) ABSTRACT

A workpiece size alignment device includes a rail set including a plurality of guide rails each having a top face formed with an elongated guide channel extended longitudinally, and a ruler set mounted on the rail set and including a plurality of rulers each removably mounted in the guide channel of a respective one of the guide rails. Thus, the workpiece size alignment device has multiple rulers having different units for use and replacement, so that the operator can select the rulers having different units according to different working requirements, thereby greatly facilitating the operator working the workpiece.

11 Claims, 7 Drawing Sheets

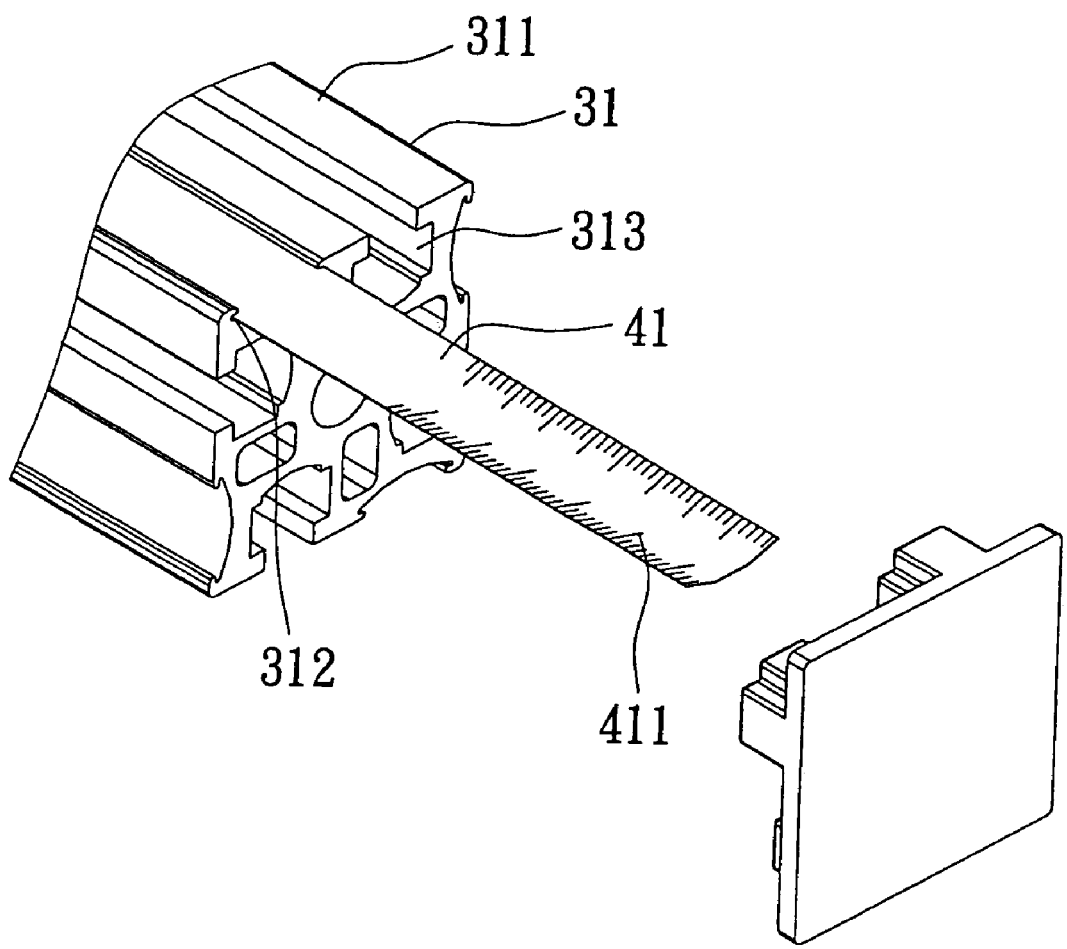
F I G. 3

US 7,107,699 B2

WORKPIECE SIZE ALIGNMENT DEVICE

BACKGROUND OF THE INVENTION

1. Field of the Invention

The present invention relates to a size alignment device for a drilling machine, and more particularly to a workpiece size alignment device that can refer ruler scales to obtain a working position.

2. Description of the Related Art

A conventional drilling machine 1 in accordance with the prior art shown in FIG. 7 comprises a worktable 11 for placing a workpiece 2, a blade seat 12 movable upward and downward relative to the worktable 11, two first guide rails 13 spaced from each other and extended along the transverse direction of the worktable 11, and a second guide rail 14 mounted between the two first guide rails 13 and extended along the longitudinal direction of the worktable 11. Each of the two first guide rails 13 has a top face 131 provided with a plurality scales 132, and the second guide rail 14 has a top face 141 provided with a plurality scales 142. Thus, when the workpiece 2 is placed on the worktable 11, the operator can refer the scales 132 of the two first guide rails 13 and the scales 142 the second guide rail 14 to obtain the working position of the workpiece 2. Then, the blade seat 12 moved downward relative to the worktable 11 to drill the workpiece 2. However, the scales 132 and 142 of the two first guide rails 13 and the second guide rail 14 only have a single unit (such as the metric system or the English system), so that the drilling machine 1 is only available for a fixed unit and cannot fit other different units, thereby limiting the versatility of the drilling machine 1.

SUMMARY OF THE INVENTION

In accordance with the present invention, there is provided a workpiece size alignment device, comprising a rail set including a plurality of guide rails each having a top face formed with an elongated guide channel extended longitudinally, and a ruler set mounted on the rail set and including a plurality of rulers each removably mounted in the guide channel of a respective one of the guide rails of the rail set.

The primary objective of the present invention is to provide a workpiece size alignment device that can change different ruler units so that an operator can work a workpiece easily and conveniently.

Another objective of the present invention is to provide a workpiece size alignment device, wherein the workpiece size alignment device has multiple rulers having different units for use and replacement, so that the operator can select the rulers having different units according to different working requirements, thereby greatly facilitating the operator working the workpiece.

A further objective of the present invention is to provide a workpiece size alignment device, wherein each of the guide rails contains at least two rulers for use and replacement, thereby facilitating the operator working the workpiece.

Further benefits and advantages of the present invention will become apparent after a careful reading of the detailed description with appropriate reference to the accompanying drawings.

BRIEF DESCRIPTION OF THE DRAWINGS

FIG. 3 is a partially cut-away perspective enlarged view of the workpiece size alignment device as shown in FIG. 1;

DETAILED DESCRIPTION OF THE INVENTION

Figure 1:
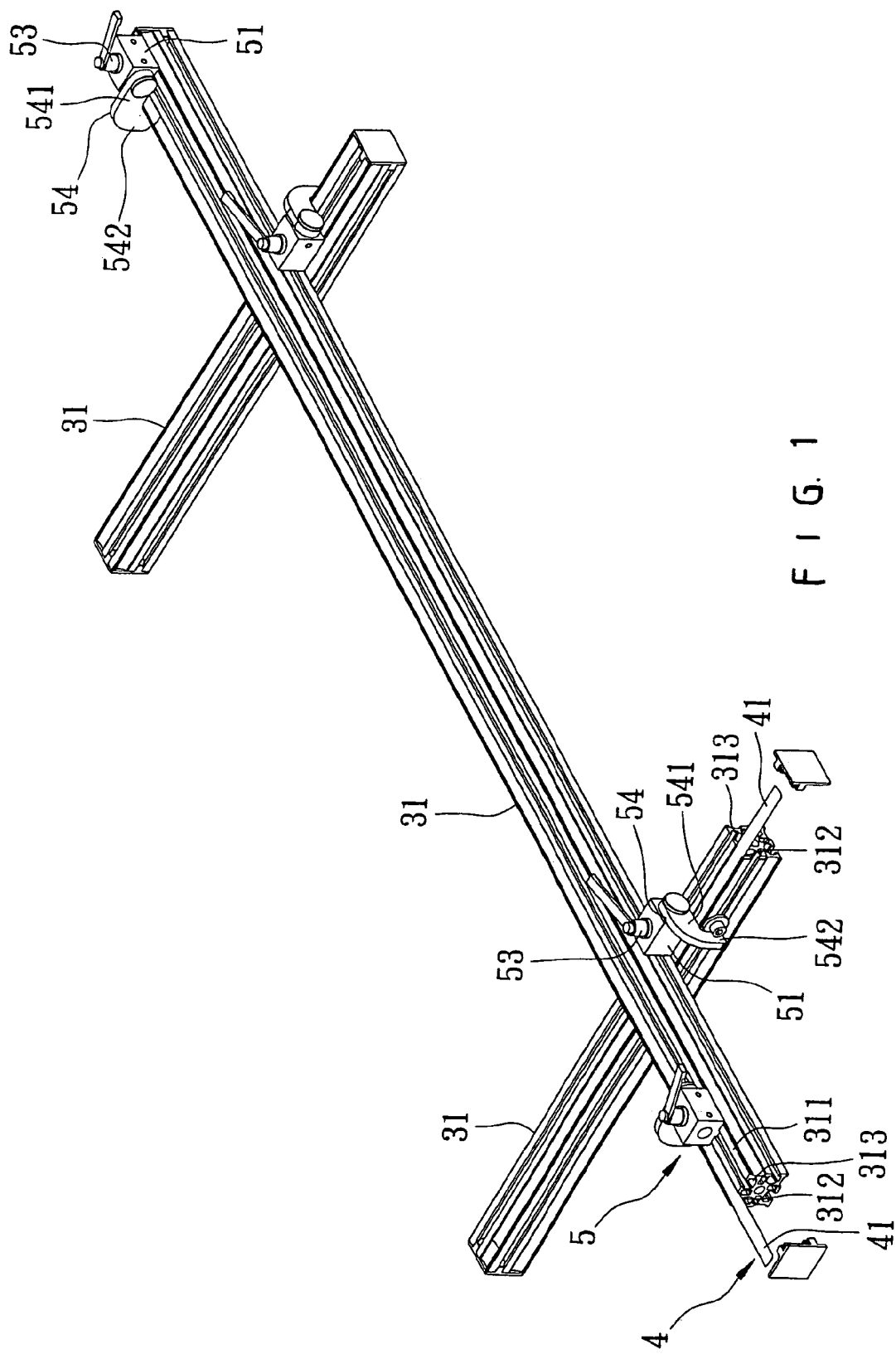
FIG. 1 is a perspective view of a workpiece size alignment device in accordance with the preferred embodiment of the present invention.
Figure 2:
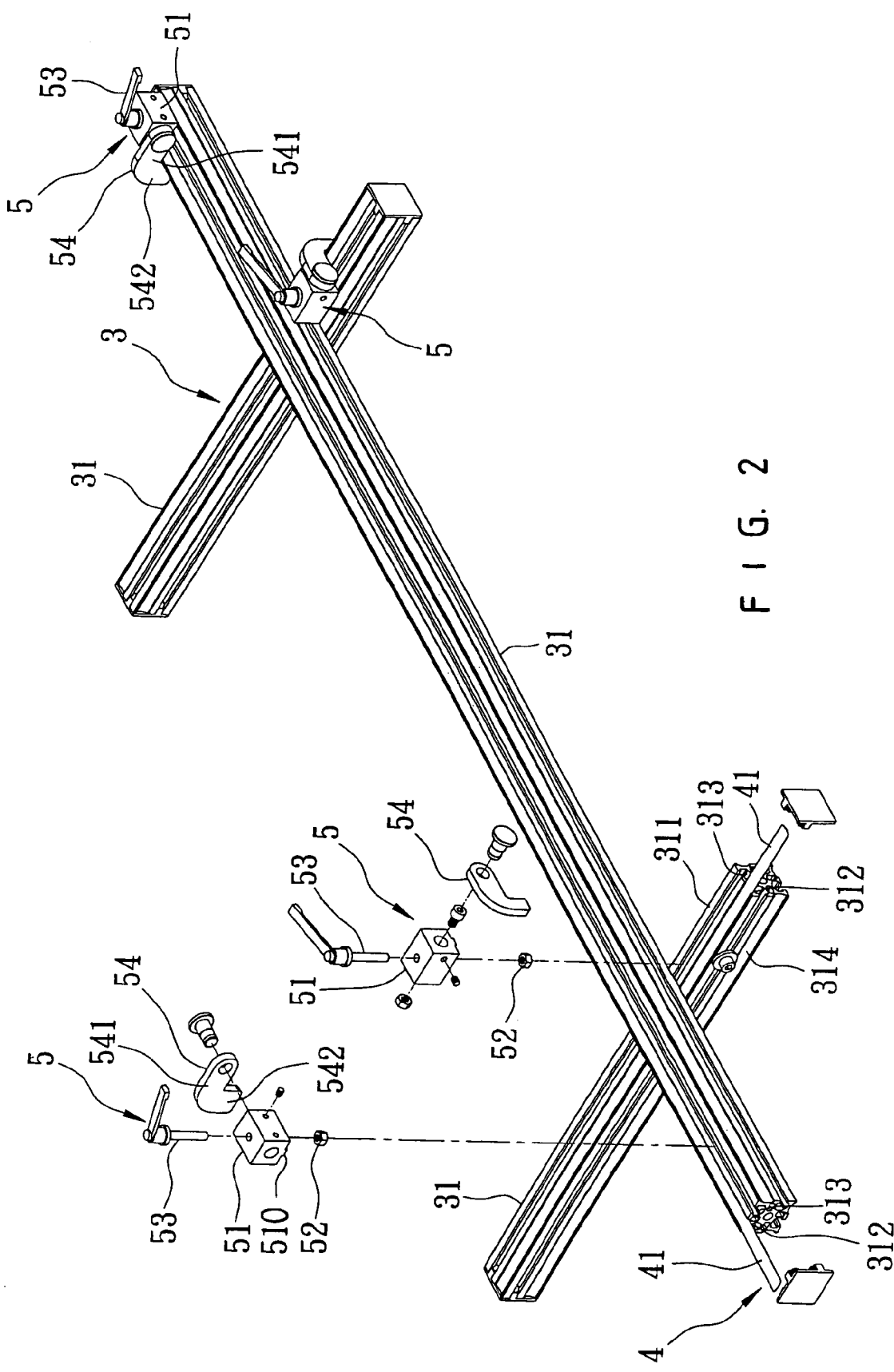
FIG. 2 is a partially exploded perspective view of the workpiece size alignment device as shown in FIG. 1.
Figure 4:
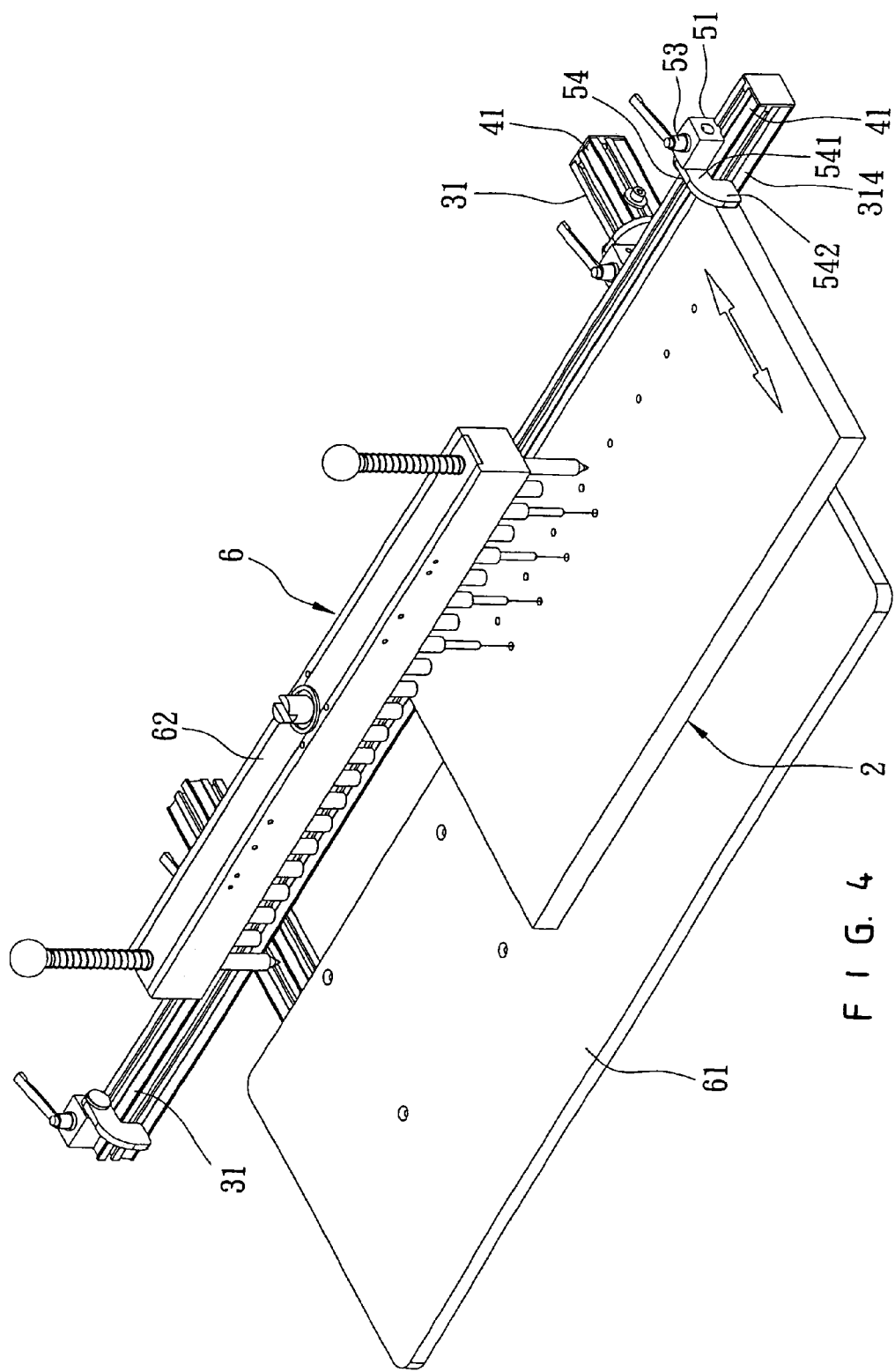
FIG. 4 is a perspective view showing the workpiece size alignment device being used for a drilling machine.

Referring to the drawings and initially to FIGS. 1–3, a workpiece size alignment device in accordance with the preferred embodiment of the present invention comprises a rail set 3, a ruler set 4, and a plurality of fastening members 5.

The rail set 3 includes three guide rails 31, wherein two first guide rails 31 are spaced from each other and are extended longitudinally, and a second guide rail 31 is mounted between the two first guide rails 31 and is extended transversely. Each of the guide rails 31 has a top face 311 formed with an elongated dovetail-shaped guide channel 312 extended longitudinally and an elongated dovetail-shaped slideway 313 extended longitudinally and parallel with the guide channel 312. Each of the guide rails 31 has a side formed with a resting face 314.

The ruler set 4 is mounted on the rail set 3 and includes a plurality of rulers 41 each removably mounted in the guide channel 312 of a respective one of the guide rails 31 of the rail set 3. The rulers 41 of the ruler set 4 have different sizes and units, and each of the rulers 41 has a top face provided with a plurality of scales 411 exposed outward from the guide channel 312 of the respective guide rail 31.

Each of the fastening members 5 is mounted on the rail set 3 and includes a slide 51 slidably mounted on the top face 311 of a respective one of the guide rails 31, an urging nut 52 slidably mounted in the slideway 313 of a respective one of the guide rails 31, a quick release 53 extended through the slide 51 and screwed into the urging nut 52, and a cantilever 54 pivotally mounted on a side of the slide 51.

The slide 51 of each of the fastening members 5 is slidable relative to the slideway 313 of a respective one of the guide rails 31 and has a bottom formed with a protruding slide block 510 slidably mounted in the slideway 313 of a respective one of the guide rails 31.

When the quick release 53 of each of the fastening members 5 is urged on the slide 51, the urging nut 52 is forced by the quick release 53 and urged on a wall of the slideway 313 of the respective guide rail 31, so that the slide 51 is fixed on the respective guide rail 31. Alternatively, when the quick release 53 of each of the fastening members 5 is loosened from the slide 51, the urging nut 52 is released from the quick release 53 to detach from the wall of the slideway 313 of the respective guide rail 31, so that the slide 51 is slidable on the respective guide rail 31.

The cantilever 54 of each of the fastening members 5 has a distal end provided with a hook-shaped indication portion 541 passed through the guide channel 312 of a respective one of the guide rails 31 and a respective one of the rulers 41. The indication portion 541 of the cantilever 54 of each of the fastening members 5 has a catch portion 542 extending downward and rested on the resting face 314 of a respective one of the guide rails 31.

Referring to FIGS. 1–4, the workpiece size alignment device is mounted on a drilling machine 6 comprising a worktable 61 for placing a sheet-shaped workpiece 2, and a blade seat 62 movable upward and downward relative to the worktable 61.

When in use, the quick release 53 is loosened from the slide 51, so that the slide 51 is slidable on the top face 311 of the respective guide rail 31. Thus, the cantilever 54 is moved with the slide 51 until the indication portion 541 of the cantilever 54 is aligned with and pointed to the predetermined scale 411 of the respective ruler 41. Then, the quick release 53 is tightened, so that the slide 51 is fixed on the top face 311 of the respective guide rail 31. Thus, the workpiece 2 is rested on the catch portion 542 of the cantilever 54 or the transversely extended second guide rail 31 is rested on the slide 51 to function as a basis position. Thus, when the operator is working the workpiece 2, the operator can refer the scales 411 of the longitudinally or transversely extended rulers 41 so as to obtain the exact working position, of the workpiece 2.

In addition, each of the rulers 41 can be removed from the guide channel 312 of the respective guide rail 31, and another ruler 41 having a different unit can be inserted into the guide channel 312 of the respective guide rail 31 for reference. Thus, the workpiece size alignment device has multiple rulers 41 having different units for use and replacement, so that the operator can select the rulers 41 having different units according to different working requirements, thereby facilitating the operator working the workpiece 2.

Figure 5:
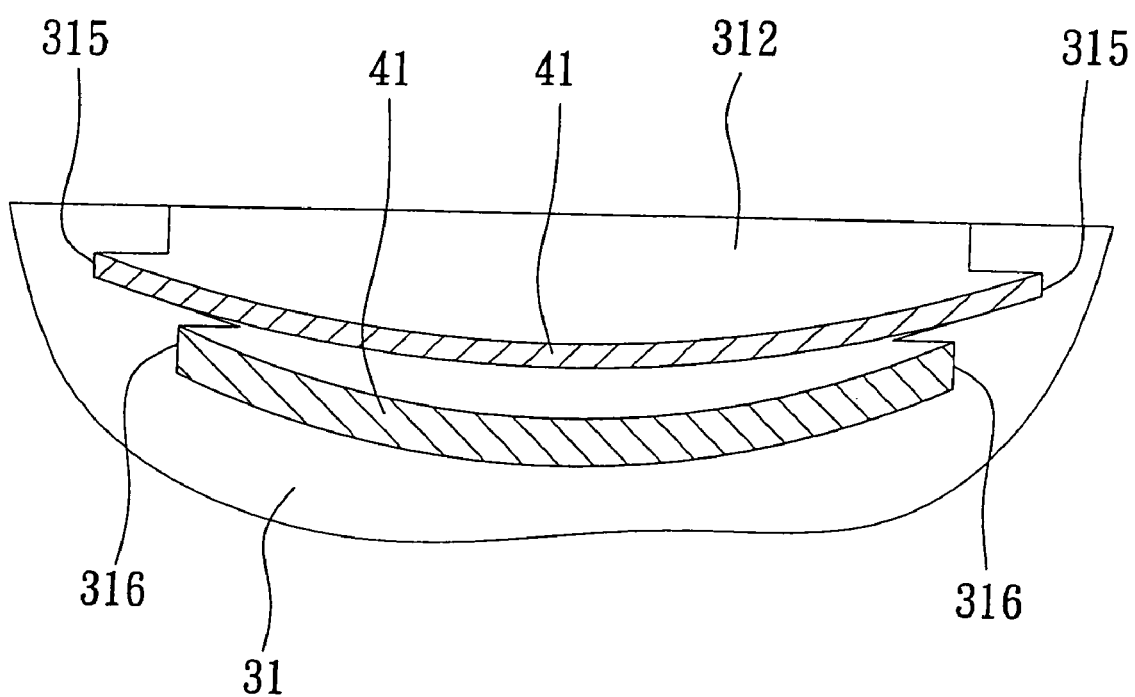
FIG. 5 is a side plan cross-sectional assembly view of a guide rail of a workpiece size alignment device in accordance with another embodiment of the present invention.
Figure 6:
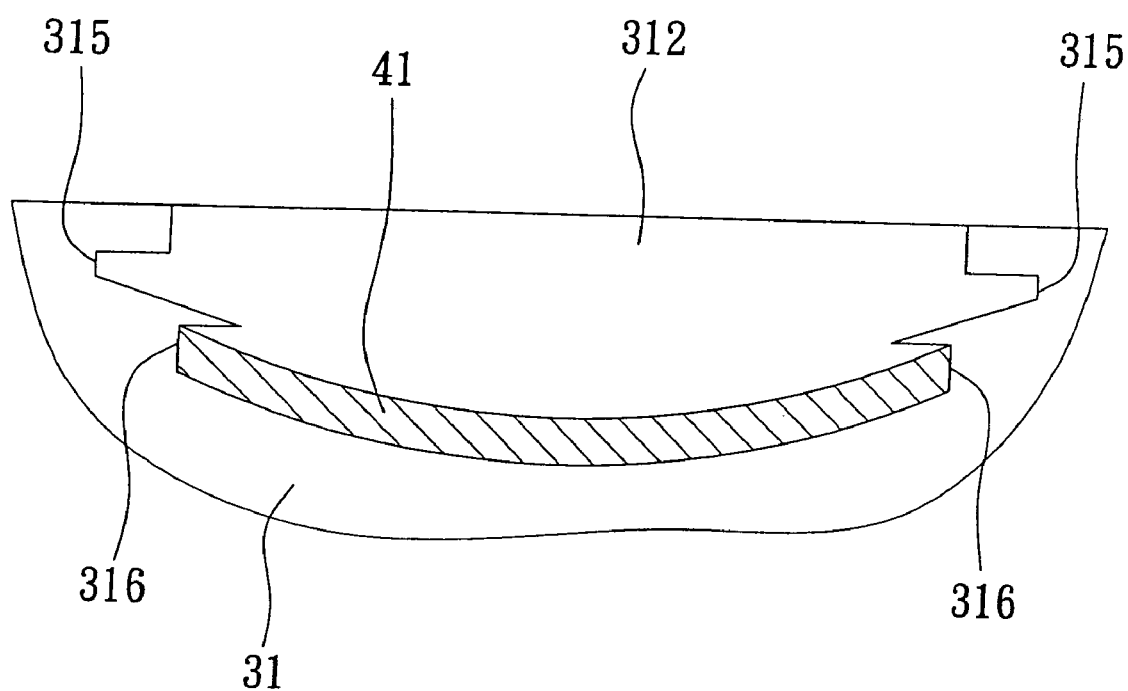
FIG. 6 is a partially side plan cross-sectional assembly view of the guide rail of the workpiece size alignment device as shown in FIG. 5.
Figure 7:
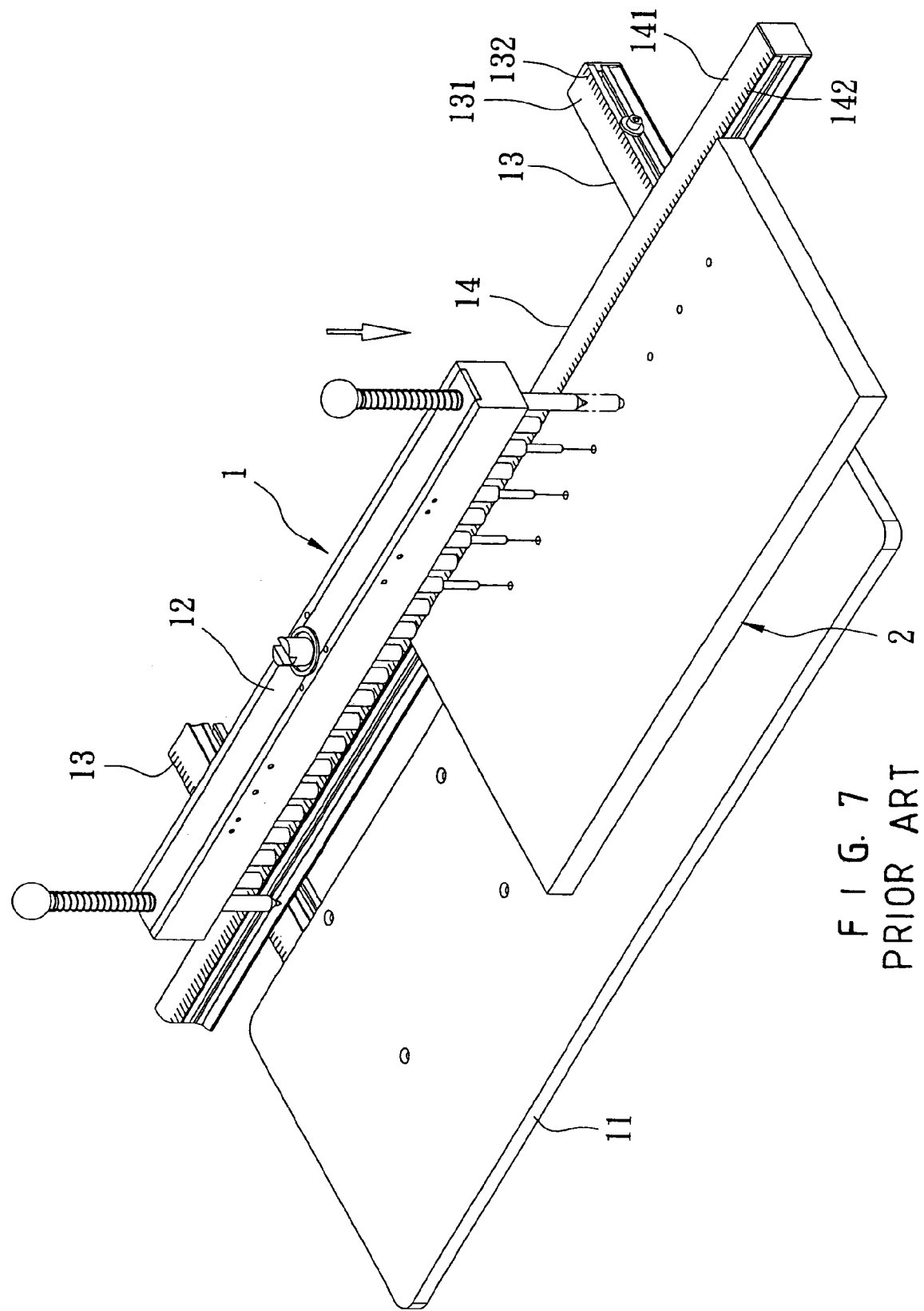
FIG. 7 is a perspective view of a conventional drilling machine.

Referring to FIGS. 5 and 6, the guide channel 312 of each of the guide rails 31 has two side walls each formed with a first groove 315 to receive one of the rulers 41 and a second groove 316 located under the first groove 315 to receive another one of the rulers 41. Each of the first grooves 315 and the second grooves 316 has an arc-shaped-portion extended along a width direction of each of the guide rails 31, so that the rulers 41 are retained by the first grooves 315 and the second grooves 316 and are located at an arc-shaped state. Thus, each of the guide rails 31 contains two rulers 41 for use and replacement, thereby facilitating the operator working the workpiece 2.

Accordingly, the workpiece size alignment device has multiple rulers 41 having different units for use and replacement, so that the operator can select the rulers 41 having different units according to different working requirements, thereby facilitating the operator working the workpiece 2. In addition, each of the guide rails 31 contains at least two rulers 41 for use and replacement, thereby facilitating the operator working the workpiece 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A workpiece size alignment device, comprising:
    a rail set including a plurality of guide rails each having a top face formed with an elongated guide channel extended longitudinally;
    a ruler set mounted on the rail set and including a plurality of rulers each removably mounted in the guide channel of a respective one of the guide rails of the rail set;
    wherein the guide channel of each of the guide rails has two side walls each formed with a first groove to receive one of the rulers and a second groove located under the first groove to receive another one of the rulers.

2. The workpiece size alignment device in accordance with claim 1, wherein the rulers of the ruler set have different sizes and units.

3. The workpiece size alignment device in accordance with claim 1, wherein each of the rulers has a top face provided with a plurality of scales exposed outward from the guide channel of the respective guide rail.

4. The workpiece size alignment device in accordance with claim 1, wherein the guide channel of each of the guide rails is dovetail-shaped.

5. The workpiece size alignment device in accordance with claim 1, wherein the top face of each of the guide rails is formed with an elongated slideway extended longitudinally and parallel with the guide channel, and the workpiece size alignment device further comprises a plurality of fastening members each mounted on the rail set and each including a slide slidably mounted on the top face of a respective one of the guide rails, an urging nut slidably mounted in the slideway of a respective one of the guide rails, a quick release extended through the slide and screwed into the urging nut, and a cantilever pivotally mounted on a side of the slide.

6. The workpiece size alignment device in accordance with claim 5, wherein the slideway of each of the guide rails is dovetail-shaped.

7. The workpiece size alignment device in accordance with claim 5, wherein the slide of each of the fastening members is slidable relative to the slideway of a respective one of the guide rails and has a bottom formed with a protruding slide block slidably mounted in the slideway of a respective one of the guide rails.

8. The workpiece size alignment device in accordance with claim 5, wherein when the quick release of each of the fastening members is urged on the slide, the urging nut is forced by the quick release and urged on a wall of the slideway of the respective guide rail, so that the slide is fixed on the respective guide rail.

9. The workpiece size alignment device in accordance with claim 8, wherein when the quick release of each of the fastening members is loosened from the slide, the urging nut is released from the quick release to detach from the wall of the slideway of the respective guide rail, so that the slide is slidable on the respective guide rail.

10. The workpiece size alignment device in accordance with claim 1, wherein each of the first grooves and the second grooves has an arc-shaped portion extended along a width direction of each of the guide rails, so that the rulers are retained by the first grooves and the second grooves and are located at an arc-shaped state.

11. The workpiece size alignment device in accordance with claim 1, wherein each of the guide rails contains two rulers.

* * * * *